United States Patent
Guasti

(10) Patent No.: US 12,318,829 B2
(45) Date of Patent: Jun. 3, 2025

(54) AIR CONDUIT SPIRALLY WOUND AND PROVIDED WITH A PLURALITY OF HOLES, RELATED MANUFACTURING MACHINE AND METHOD AND RELATED STRIP

(71) Applicant: ZEFFIRO S.R.L., Florence (IT)

(72) Inventor: Gino Guasti, Florence (IT)

( * ) Notice: Subject to any disclaimer, the term of this patent is extended or adjusted under 35 U.S.C. 154(b) by 781 days.

(21) Appl. No.: 17/056,346

(22) PCT Filed: May 24, 2019

(86) PCT No.: PCT/IB2019/000459
§ 371 (c)(1),
(2) Date: Nov. 17, 2020

(87) PCT Pub. No.: WO2019/229518
PCT Pub. Date: Dec. 5, 2019

(65) Prior Publication Data
US 2021/0213506 A1    Jul. 15, 2021

(30) Foreign Application Priority Data

May 29, 2018 (IT) ......................... 102018000005813
Oct. 16, 2018 (IT) ......................... 102018000009504

(51) Int. Cl.
*B21C 37/12*    (2006.01)
*B21C 37/15*    (2006.01)

(52) U.S. Cl.
CPC .......... *B21C 37/122* (2013.01); *B21C 37/126* (2013.01); *B21C 37/128* (2013.01); *B21C 37/157* (2013.01)

(58) Field of Classification Search
CPC ... B21C 37/122; B21C 37/126; B21C 37/128; B21C 37/157; B21C 37/12; F16L 9/165; F16L 9/16; F24F 13/02
See application file for complete search history.

(56) References Cited

U.S. PATENT DOCUMENTS

| 3,183,695 | A | * | 5/1965 | Darner | ................... | B21C 37/124 72/137 |
| 8,578,576 | B2 | * | 11/2013 | Castricum | ............. | B21C 37/124 29/6.2 |
| 2016/0050948 | A1 | | 2/2016 | Robbins | | |

FOREIGN PATENT DOCUMENTS

| DE | 10055950 A1 | 5/2002 |
| KR | 101642138 B1 | 7/2016 |

(Continued)

*Primary Examiner* — Robert G Bachner
(74) *Attorney, Agent, or Firm* — William Fitzpatrick

(57) ABSTRACT

Apparatus (10) for forming a spirally wound conduit (14) from a flat strip (2) comprising: a forming device (6) comprising a bending section (7) configured to spiralling bend the strip (2) and a joining section (8) configured to join opposite longitudinal sides (2A,2B) of the strip (2) each other; a feeding device (11) of the strip (2) along a feeding direction (F) parallel to the longitudinal edges (9) of the strip (2); a cutting device (1) arranged upstream the forming device (6) comprising a cutting head (3) for cutting the strip (2) and moving means configured to move said cutting head (3) along a plurality of moving axes (X,Y,Z) orthogonal to each other; a control unit (18) configured to command said moving means according to diameter (D) of the conduit (14) to be realized and to the width (B) of the strip (2) so that said cutting head (3) realizes on the strip (2) a plurality of arrays (12) of holes (13) each one tilted with respect to one of the longitudinal edges (9) of the strip (2) by an angle (α) function of the width (B) of the strip (2) and of the diameter (D) of the spiral conduit (14) to be realized. The present invention relates also to a air conduit (14), a perforated strip (2') and a coil (19) of a perforated strip (2') comprising a plurality of said arrays (12) of holes (13) wherein said holes (13) comprise at least two different shapes.

14 Claims, 5 Drawing Sheets

(56) References Cited

FOREIGN PATENT DOCUMENTS

Figure 12:
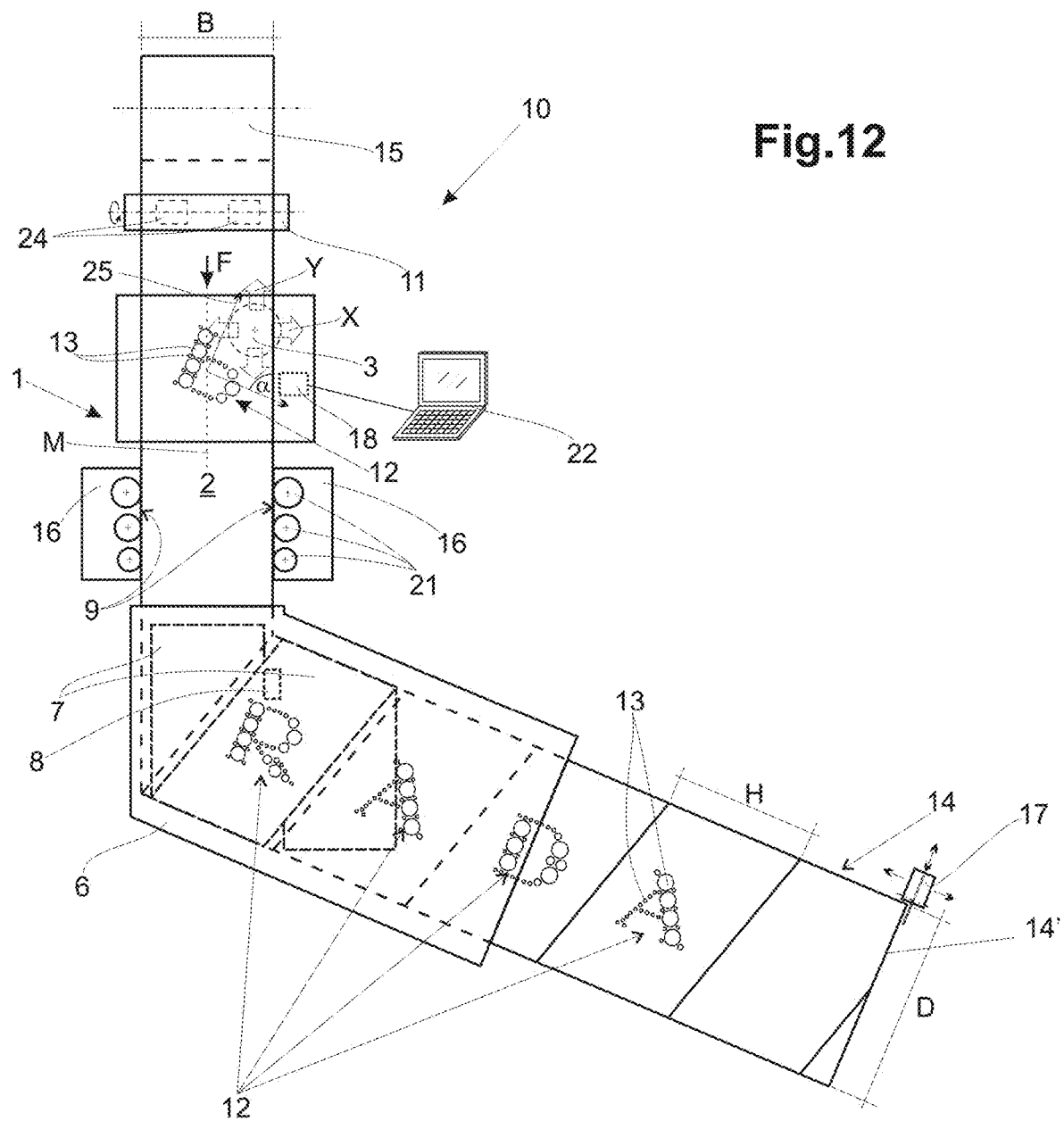

WO           9851424   A1    11/1998
WO           0245875   A1     6/2002

\* cited by examiner

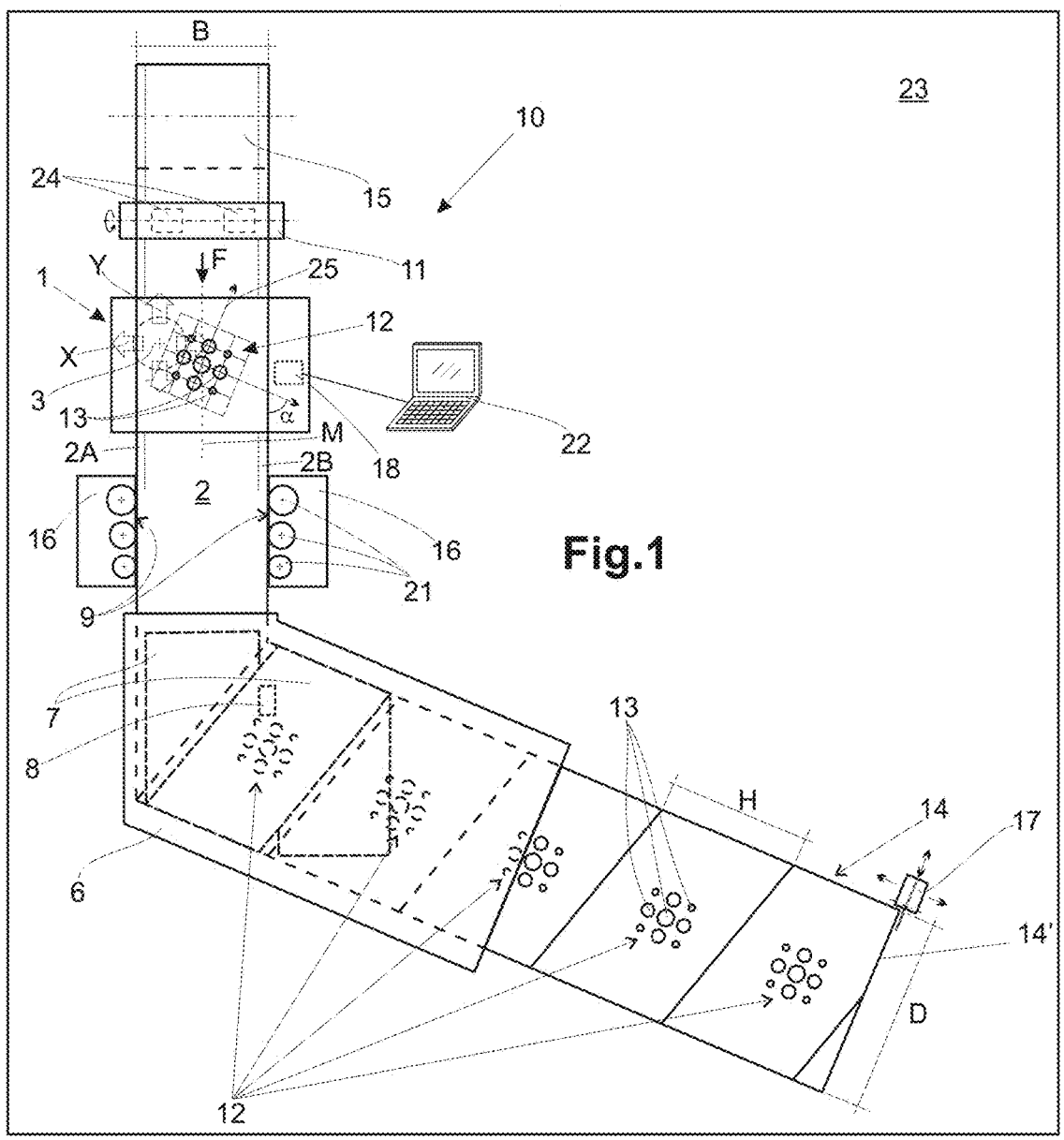
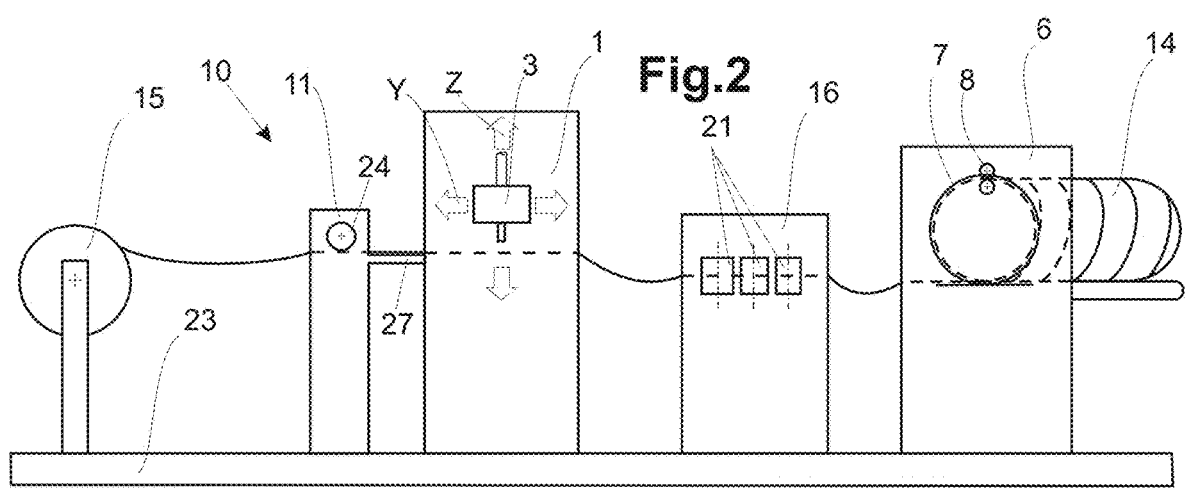

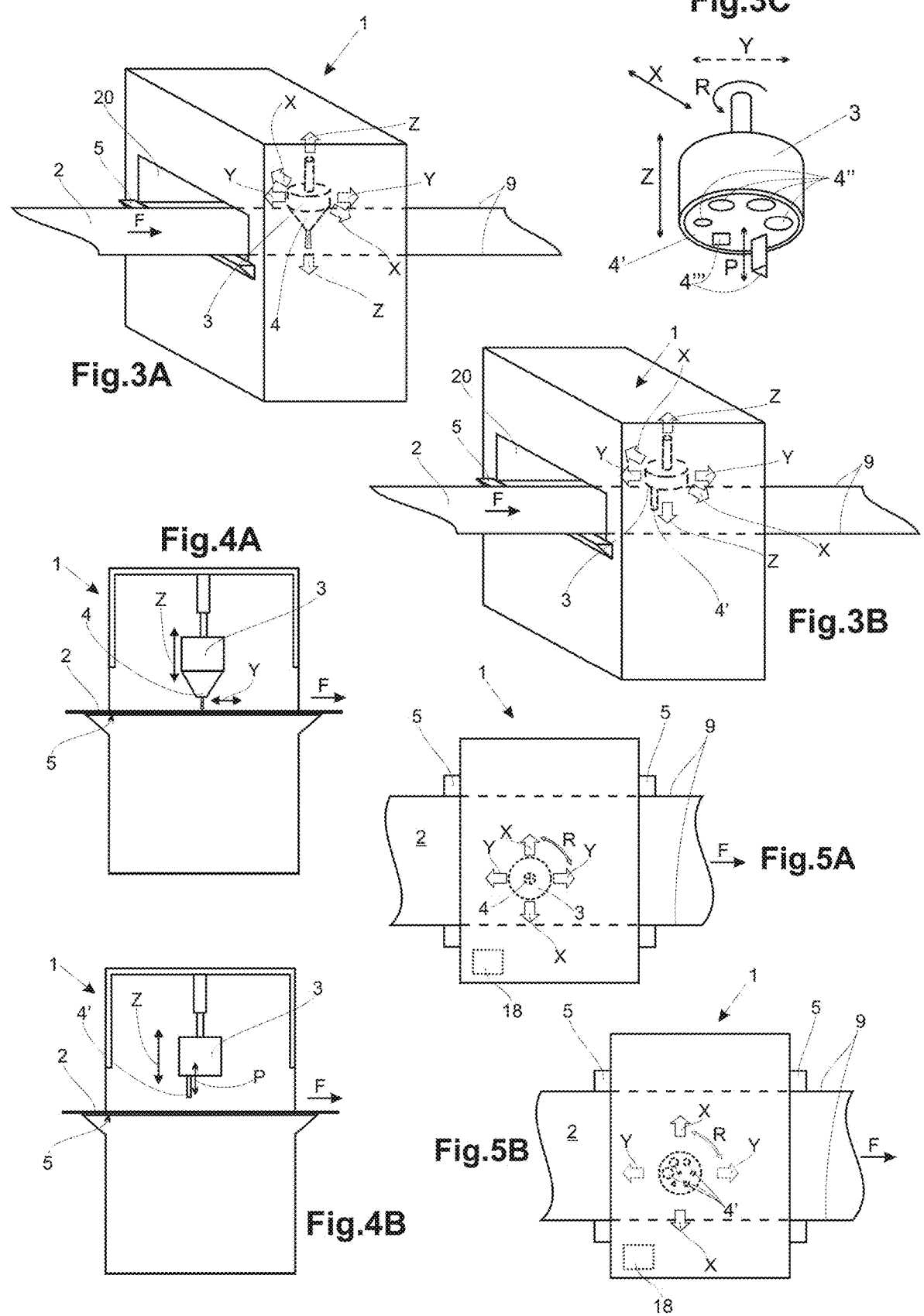

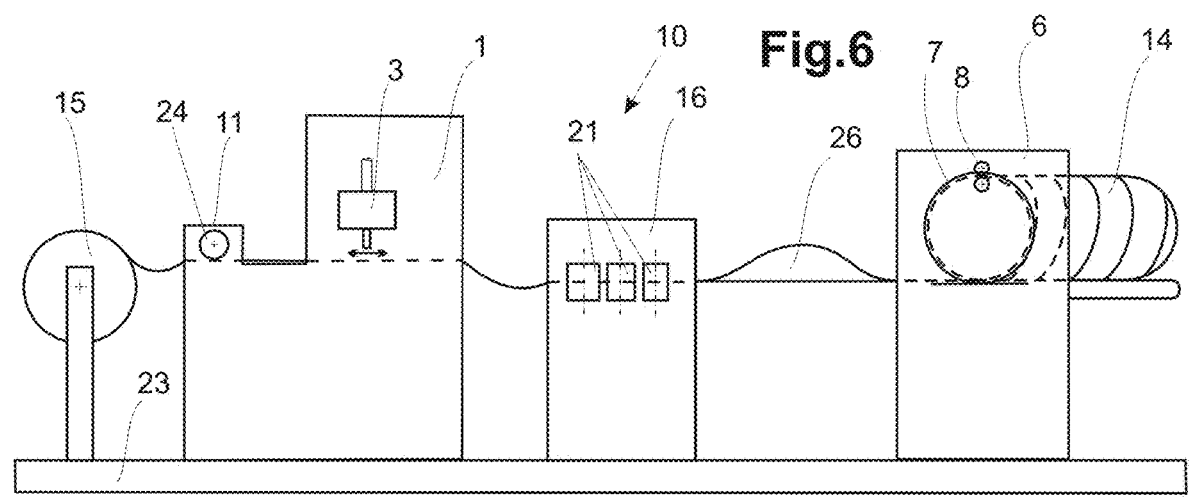
Fig.6
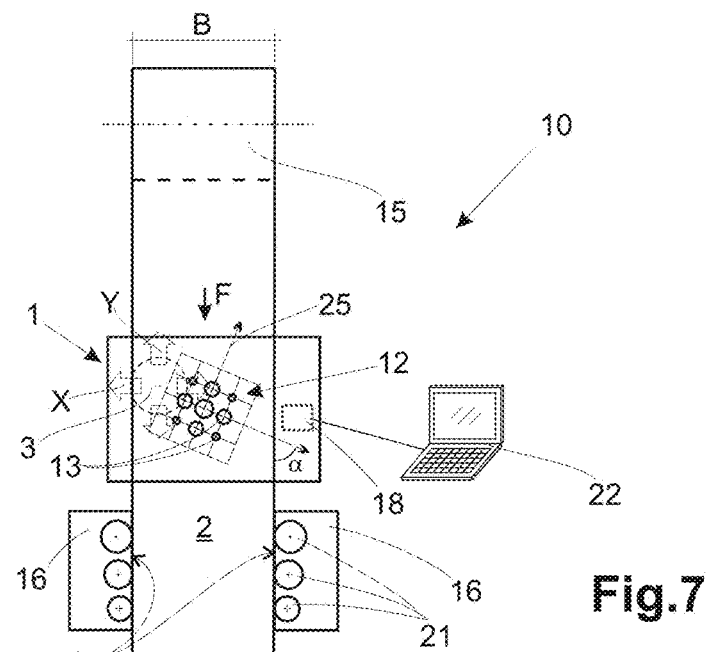
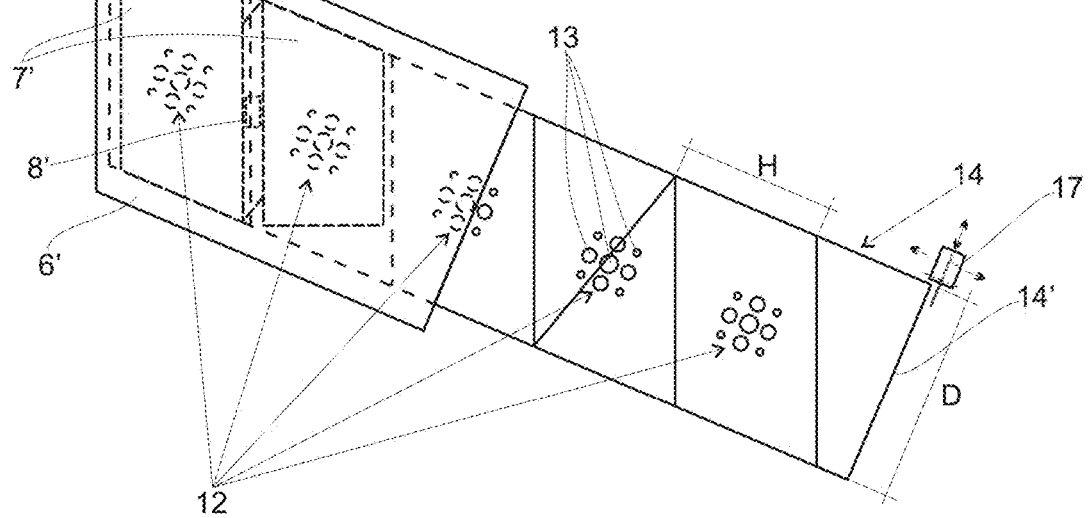
Fig.7

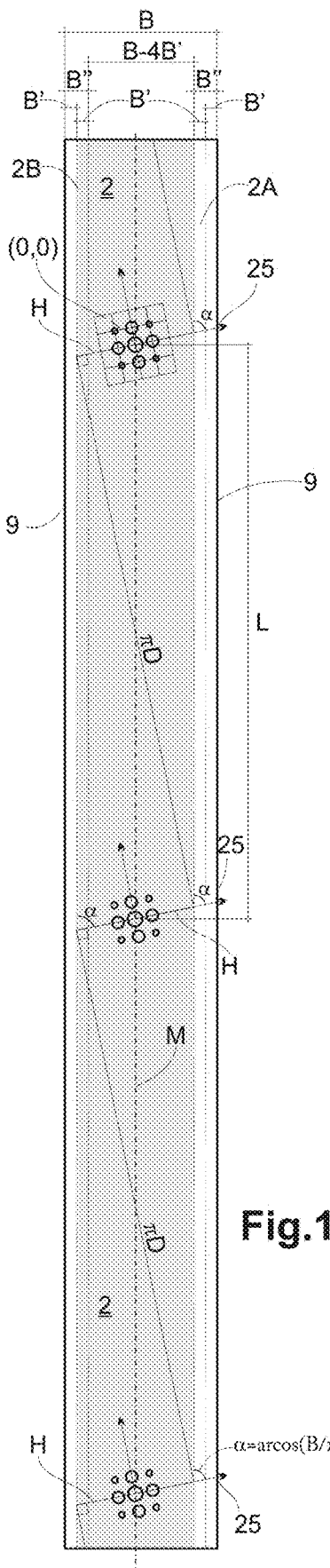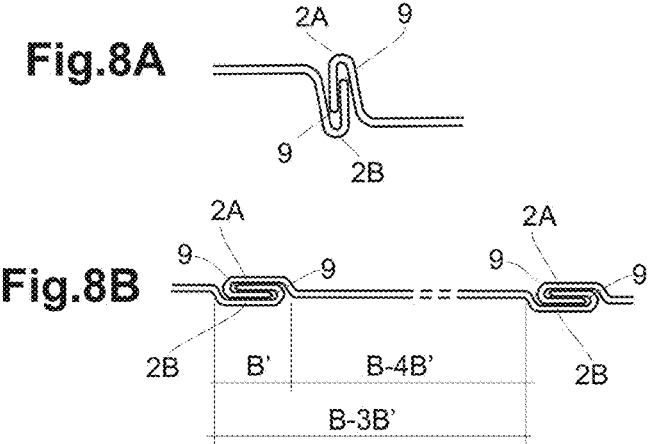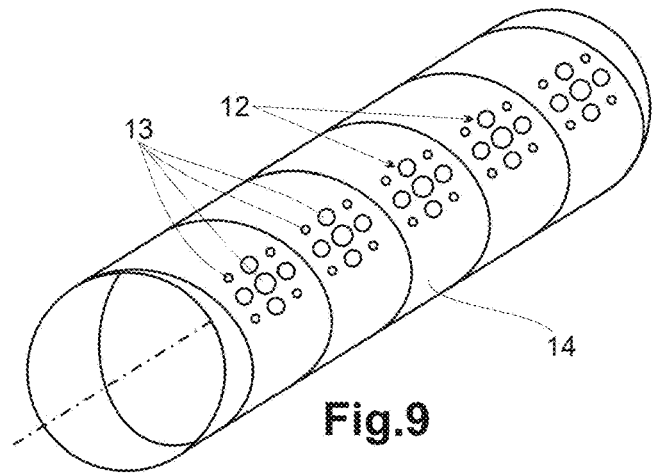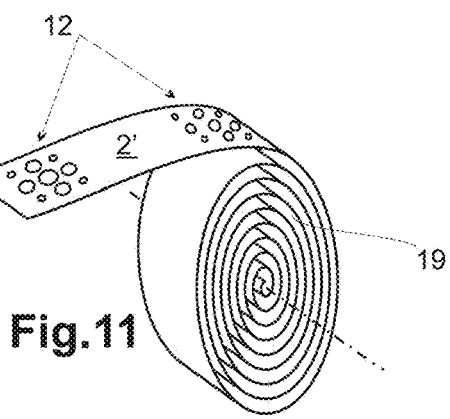
Fig.8A
Fig.8B
Fig.9
Fig.10
Fig.11
AIR CONDUIT SPIRALLY WOUND AND PROVIDED WITH A PLURALITY OF HOLES, RELATED MANUFACTURING MACHINE AND METHOD AND RELATED STRIP

CROSS-REFERENCE TO RELATED APPLICATION

This application is a US National Stage Application of PCT/IB2019/000459 filed May 24, 2019, which claims priority to Italian patent application no. 102018000005813 filed May 29, 2018 and Italian patent application no. 102018000009504 filed Oct. 16, 2018 the entire contents of which are incorporated herein by reference for all purposes.

TECHNICAL FIELD

The present invention relates to the field of air conduits. In particular, it relates to the field of air conduits for commercial and residential buildings.

BACKGROUND ART

The background art comprises various solutions for conduits and related machines for manufacturing them.

In particular, it's known to realize conduits spirally wounding and joining a metal strip. These types of conduits are realized spirally or helically bending a strip and joining longitudinal opposite edges of the strip each other. Said opposite edges are normally joined each other through welding or seaming for avoiding that a conduit opens laterally or for avoiding airflow leakages.

These conduits are used in various fields but it's an object of the present invention the use of these conduits for aeration of an environment, preferably residential or commercial environments, wherein people live. It's a further object of the present invention the realization of air conduits not corrugated, thus having an external surface which is substantially smooth.

In the background art are known various solutions which describe conduits and/or related machines for realizing holes on conduit spirally wounded from a strip. Said spirally wounded conduits are also denominated spiral conduits.

For example the document EP1227902 describes a machine and a method for punching and clinching a strip before it is wounded and seamed, and for realizing nozzles on the spiral conduit. This document describes the possibility of making these nozzles only on a portion of the conduit, for example only on a side, but it does not describe in which position and in which manner these nozzles have to be done in order to obtain optimized geometries of aeration. Furthermore this document misses several technical details on the functioning of the punching and on the whole machine as a whole which the skilled man would have not obtained from other known teachings. A teaching similar to this can be founded in the document KR101642138.

Another similar document is the patent DE2832508 which describes a system for making holes on a conduit which are aligned on the conduit once the strip is joined and the spiral conduit realized. This system misses several technical details, for example it does not describe how the impulse generator can command the punching once the spiral conduit lengthens. Elongating the conduit the element attached to the end of the conduit moves some meters during the seaming of the conduit, making the command and movement coordination of the machine very complex.

In a similar manner to the above mentioned documents, the document WO 02/45875 describes an apparatus comprising a punching machine arranged upstream to a forming device for perforating the strip so that, once it is spirally wounded, the holes are substantially aligned on the conduit. This document also describes to coordinate the auctioning of the punching machine with the functioning of the forming device of spiral conduit, but it does not describe how the punching machine has to be controlled for realizing cuttings having a geometry and a position variable in function of the strip width and of the spiral conduit diameter. Furthermore, in this document the punching machine moves only according to a vertical punching direction and, as a function of the strip to be used, the punches need to be configured every time and before starts up the apparatus.

Further, the patent application US20150273552 describes a machine for performing some apertures on a conduit through a laser cutting device, when the conduit is already seamed. While the document DE10055950 describes a machine with two horizontal axes for laser cutting a conduit welded according to its length.

Furthermore, in the state of the art are known various solutions having rollers opportunely shaped for realizing a plurality of holes on a strip that has to be bent and seamed. An example in this sense can be the patent application WO1998051424, which describes a roller arranged upstream the bending and seaming machine of the strip which is conveniently shaped so to create a plurality of apertures on the strip. Once the strip is wounded and seamed, the conduit has a plurality of holes on a portion or on the entire circumference of the conduit. This solution has the limit to impose always the same geometry of perforation on the strip, rendering this type of machine not flexible for an industrial production.

It is also known to realize conduits with holes arranged only on a side of the conduit and aligned each other. An example in this sense is provided by the document US20160050948. This document, as all previously cited, does not show how to obtain through holes aligned on the conduit starting for a strip.

In particular, said documents do not describe to hole the strip so that the geometries of the holes on the strip provide a specific geometry on the spiral conduit. The known teaching miss several technical information for permitting to the skilled person to realize without inventive activity spiral air conduits with ordinated and industrially reproducible geometries of holes on conduits of any diameter and using strips of any width.

Furthermore none of the known documents disclose to optimize the geometries of holes on the conduit based on functional parameters of the conduit itself, when the conduit is installed and used in an environment lived by people.

Finally, in the state of the art are known few systems wherein through holes are realized on the side wall of a conduit once the latter is joined or seamed. An example in this sense is contained in the document U.S. Pat. No. 3,183,695 which discloses to perforate a conduit once the conduit is corrugated and spirally wounded.

These solutions use preferably machine with plasma cutting. The conduits obtained in this way have burnings in correspondence of the holes, compromising the possibility of selling them in certain field like those for civil or commercial environments.

SUMMARY

Said inconvenients of the state of the art are now solved by an apparatus for forming a spirally wound conduit from a flat strip comprising a forming device comprising a bending section configured to spiralling bend the strip and a joining section configured to join opposite longitudinal sides of the strip each other; a feeding device of the strip along a feeding direction parallel to the longitudinal edges of the strip; a cutting device arranged upstream the forming device comprising a cutting head for cutting the strip and moving means configured to move said cutting head along a plurality of moving axes orthogonal to each other. In particular, said moving axes being an axis orthogonal to the feeding direction of the strip and parallel to a levelling plane on which the strip lies and a longitudinal axis parallel to the feeding direction and/or a vertical axis to said levelling plane.

Said apparatus also comprises a control unit configured to command said moving means according to the diameter of the conduit to be realized and to the width of the strip so that said cutting head realizes on the strip a plurality of arrays of holes each one tilted with respect to one of the longitudinal edges of the strip by an angle that is function of the width of the strip and of the diameter of the spiral conduit to be realized.

Said apparatus solves the inconvenients of the known art and permits to realize holes aligned on the conduit and having different shapes, in a faster and simplified manner. In particular, said apparatus allows to realize arrays of holes different to each other, or different types of holes, without structurally modifying the apparatus and without costly initial tooling activities. If the strip is wider or narrower, or if the conduit diameter is different, the apparatus is able to adapt itself to the new input. The apparatus so conceived is also able to realize different holes in the same matrix or matrixes of holes different to each other.

The present device solves the problem of generating different arrays of holes aligned on the conduit with a single machine for forming conduits spirally wounded from a flat strip independently from the strip or conduit dimensions. A further scope of the present invention is that of providing an air conduit of the type obtained from a strip bent like a spiral and seamed, and comprising a plurality of arrays of holes. Said arrays being aligned along the conduit and each array being tilted with respect to one of the longitudinal edges of the strip by an angle that is function of the width of the strip and of the diameter of the spiral conduit, wherein said holes of said arrays has at least two shapes different to each other. Said arrangement of holes permits to obtain an optimized and more efficient distribution of the airflow flowed by the conduit.

It's another scope of the present invention to provide a perforated strip, and the related coil of perforated strip, so to realize air conduit of the of the type spirally lock seamed comprising a plurality of arrays of holes tilted with respect to one of the longitudinal edges of the strip by an angle which is function of the width of the strip and of the diameter of the conduit to be realized, wherein said holes of said arrays comprise at least two different shapes. Said perforated strip permits to obtain a conduit with an airflow distribution improved even if the manufacturer owns only a traditional machine for spirally wounding and seaming a strip and not a machine for perforating the strip.

It's finally a further scope of the invention to provide a manufacturing method of an air spirally wound conduit having a plurality of arrays aligned with each other along the conduit, comprising the phases of:
perforating the strip with a plurality of arrays of holes tilted with respect to one of the longitudinal edges of the strip by an angle which is function of the width of the strip and of the diameter of the spiral conduit to be realized, wherein said holes of said arrays comprise at least two different shapes of holes;
spirally bending and seaming said strip so that said conduit has a predefined diameter.

Said method allows to produce a spiral conduit capable of outflow a flux of air having an improved distribution.

Further inconvenients are solved by the technical characteristic and details provided in the dependent claims of the present invention.

These and other advantages will be better understood thanks to the following description of different embodiments of said invention given as non-limitative examples thereof, making reference to the annexed drawings.

DRAWINGS DESCRIPTION

In the drawings:
FIG. 1 shows a schematic view of the apparatus for forming a spirally wound conduit having holes according to the present invention;
FIG. 2 shows a schematic side view of the apparatus of FIG. 1;
FIG. 3A shows a schematic axonometric view of the cutting device according to a first embodiment of the present invention;
FIG. 3B shows a schematic axonometric view of the cutting device according to a second embodiment of the present invention, when the cutting device is a puncher;
FIG. 3C shows a schematic view of a detail of the puncher's cutting device of FIG. 3B;
FIG. 4A shows a schematic view of the cutting device of FIG. 3A sectioned according to a vertical-longitudinal plan;
FIG. 4B shows a schematic view of the cutting device of FIG. 3B sectioned according to a vertical-longitudinal plan;
FIG. 5A shows a schematic view from above of the cutting device of FIG. 3A;
FIG. 5B shows a schematic view from above of the cutting device of FIG. 3B;
FIG. 6 shows a schematic side view of an alternative embodiment of apparatus for forming a spirally wound conduit having holes according to the present invention;
FIG. 7 shows a schematic side view of a further alternative embodiment of apparatus for forming a spirally wound conduit having holes according to the present invention;
FIGS. 8A and 8B show a schematic detailed view of the seaming of opposite sides of a strip for realizing a spiral seamed conduit;
FIG. 9 shows a conduit spirally wounded comprising holes according to the present invention;
FIG. 10 shows a perforated strip realized with part of the apparatus for forming a spirally wound conduit having holes according to the present invention;
FIG. 11 shows a coil of a perforated strip for realizing conduits spirally wounded and having aeration holes.
FIG. 12 shows a schematic view of a further embodiment of an apparatus for forming a spirally wound conduit having holes according to the present invention.

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined each other in any suitable way.

With reference to the FIGS. 1 and 2 is illustrated an apparatus 10 for realizing a spiral conduit 14 from a flat metallic strip 2. Said apparatus 10 comprises a forming device 6, a cutting device 1 and a feeding device 11.

The forming device 6 comprises two sections: a bending section 7 and a joining section 8.

The bending section 7 is configured to spirally deform a strip 2 and comprises a forming element spirally shaped which comprises input and output edges. The forming element receives as input the flat strip 2 on the inner side of the spiral and permits the deformation of the strip 2 which is sliding on the forming element according to its shape. The strip 2 so deformed acquires the characteristic spiral-shape for the following joining phase. The forming element can comprise means adapted to vary the diameter of its spiral so to realize conduits having different diameters or can be of the interchangeable type so that the most fittable forming element for realizing a certain conduit diameter can be selected.

The joining section 8 can comprise a seaming apparatus or a welding machine for joining each other the opposite longitudinal sides 2A,2B of the strip 2. The strip 2 spirally wounded by the bending section 7 can be seamed or welded so to maintain its spiral shape. Said seeming or welding also permits to avoid leakages of air when the conduit 14 is in use and under pressure. In particular, the seaming can be realized folding opposite longitudinal sides 2A,2B of the strip as shown in FIGS. 8A and 8B. The bending of said opposite longitudinal sides 2A,2B occurs through a plurality of forming rollers 8,8' which come into contact with the strip 2. Said rollers 8,8' are shaped so to fold the edges of the strip 2 one each other realizing said seaming as shown in FIGS. 8A and 8B. The portions of the strip 2 that are used for realizing this seaming are on longitudinal opposite sides 2A,2B of the strip 2 and have substantially the same length B". On the contrary, the welding of edges 9 can be realized through a TIG welder. In the state of the art are known several technical solutions for realizing said joining and bending sections 8,7 for spirally bending, wounding and seaming a metal strip.

The apparatus 10 comprises also a feeding device 11 for moving the strip 2. Preferably said strip 2 is arranged upstream the cutting device 1. The advancement of the strip 2, assured by the feeding device 11, permits to supply said cutting device with the strip 2. Optionally, said feeding device 11 can be arranged downstream the forming device 6, which is in turn arranged downstream the cutting device 1. With the term "downstream" and "upstream" reference is made to the advancement sense of the strip 2 in the apparatus 10, thus along the feeding direction F.

The feeding device 11 can comprise rollers 24 which adhere to the strip 2. The rotation of said rollers 24 determines the advancement of the strip 2. To avoid the bending of strip 2 between the feeding device 11 and the cutting device 1, these two machines can be integrated each other, as shown in FIG. 6, or can be connected by a connection deck 27 arranged between the outlet of the feeding device 11 and the inlet of the cutting device 1 so to guarantee that strip 2 remains planar during the advancement between the two machines. In this case, the forming device 6 comprises a system adapted to move the strip 2 independently by the feeding device 11, this system can be realized through forming rollers 8, which attracts the strip 2 already cut in the machine.

The feeding device 11 can be also an integral part of the forming device 6. For example, one or more forming rollers 8 can drag in rotation the strip 2. In this case, the feeding device 11 is not present and its function is performed by the forming rollers 8' (or 8) of the forming device, as shown in FIG. 7. The advancement of the strip 2 in the forming device 6 and in the cutting device 1 is guaranteed by the forming rollers 8 and 8' which drag the strip 2. Alternatively, the feeding device 11 can be installed immediately upstream the forming device 6 and can comprise, also in this case, dragging rollers 24 (version not shown).

The strip 2 is so pulled, or alternatively pushed, by the feeding device 11. The strip 2 is passed through the cutting device 1 and then through the forming device 6.

The strip 2 is withdrawn by a supplying device 15, for example a coil of strip 2. Said supplying device 15 is arranged upstream the cutting device 1.

The apparatus 10 can also comprise a bending device 16 or forming machine. Said bending device 16 can comprise a series of rollers 21 adapted to shape in continuous the metal planar strip 2 by bending. Said rollers 21 are shaped and arranged so to bend longitudinal opposite sides 2A, 2B of the strip 2 forming profiles having complementary shapes, like that represented in FIG. 8. The strip 2 enters planar in the folding device 16 and exits with a shaped profile which is propaedeutic to the seaming. For this scope can be used forming machines of strip that are available on the market.

The apparatus 10 can also comprise a shortening device 17 arranged downstream a forming device 6, adapted to shear the conduit 14 at a determined length and perpendicularly to its symmetry axis. Said shortening device 17 permits to the conduit 14 to take its traditional cylindrical shape. The shortening device 17 can comprise a circular saw, preferably capable of rotating about the conduit 14.

With reference to FIG. 3, it is shown a cutting device 1 for metal strip 2 comprising a inlet mouth 20 and an outlet mouth (not visible) through which a metal strip 2 can slide according to a feeding direction F.

Said strip 2 lies at least in part to a levelling plane 5 during the sliding of the strip 2 and during the stay of the strip for the cutting phase.

The cutting of the strip 2 occurs when the strip 2 is still in the cutting device 1, for avoiding that the edges of holes are deformed or formless. If the cutting would be operated in continuous, thus while the strip is moving in the direction F toward the forming device 6, the strip 2 would have several defects, very difficult to be corrected once that the strip 2 has been wounded to form the spiral conduit 14.

The cutting device 1, as shown in detail in the FIGS. 3, 4 and 5, has a cutting head 3 that is mobile with respect to the strip 2 according to plurality of moving axes X,Y,Z. The cutting device 1 comprises moving means configured to move the cutting head 3 along said plurality of moving axes X,Y,Z, so to allow to realize any kind of cutting in any position of the strip 2. Said moving means also permits to change the operative parameters of the cutting head 3 as it is described in details later on. In particular, said moving means are configured for moving said cutting head 3 along an axis X orthogonal to the feeding direction F of the strip 2 and parallel to a levelling plane 5 on which the strip 2 lies. Said moving means are also configured to move the cutting head 3 along a longitudinal axis Y parallel to feeding direction F and/or a perpendicular axis Z to said levelling plane 5.

The cutting head 3 is consequently able to move from one side to the other of the strip 2, thus between longitudinal edges 9 of the strip 2. The movement back and forth of the strip 2 along the feeding direction F with respect to the cutting head 3 allows, together with the movements of the head 3 along the orthogonal direction X, to perforate the strip 2 in any point of the planar surface of the strip 2 itself. The movement of the strip 2 along the feeding direction F can be commanded by the feeding device 11 which can be external to the cutting device 1 or integrated with it.

In an alternative embodiment, the moving means are also configured to move the head 3 of the cutting device 1 along a further longitudinal axis Y, orthogonal to the direction X and parallel to the feeding direction F of the strip 2. In this way, the strip 2 can enter in the cutting device 1 and stay still on the levelling plane 5 until the cutting operation is not concluded. In this case, the cutting head 3 moves along the axes X and Y for realizing a predetermined geometry of holes. Once the perforation of the strip 2 is concluded, the strip 2 can prosecute its run in direction F. Said movements along the directions X and/or Y of the cutting head 3 are realized through moving means known, like electromechanical or electropneumatic actuators. The movements of the cutting head 3 along the vertical axis Z is clarified in the following description.

A unit control 18 adapted to control the movements of the cutting head 3 is operatively connected with the moving means for moving said cutting head 3 along said plurality of moving axes X,Y,Z orthogonal to each other.

Said control unit 18 is also configured to actuate the cutting device 1 for performing the cut of the array 12 of holes 13 on the strip 2.

Said control unit 18 is configured to command the moving means of the cutting head 3 as a function of the diameter D of the conduit 14 to be realized and of the width of the strip 2, so that said cutting head 1 performs on the strip 2 a plurality of arrays 12 of holes 13. Said arrays 12 of holes 13 are each one tilted with respect to one of the longitudinal edges 9 of the strip 2 by an angle α that is function of the width B of the strip 2 and of the diameter D of the spiral conduit 14 to be realized. The control unit 18 comprises a memory containing a program configured to manage the movements of the moving means and the actuation of the cutting head 3, and also comprises a processor operatively connected to said memory and configured to execute said program.

Said control unit 18 is also configured to control the feeding device so to coordinate the advancing movements and the stops of the strip 2 with the cutting movements of the cutting head 3.

When the cutting head 3 is moveable with respect to orthogonal axes X and Y that are parallel to the levelling plane 5, the coordinated actuation of the movements of the feeding device 11 and of the head 3 of the cutting device 1 is simplified and the working defects are reduced. In this case, the strip 2 slides on the cutting device 1 moving in a sob manner, thus alternating stops to movements along the direction F and cutting phases to seaming phases.

The cutting head 3 can comprise one among: a laser cutter 4, a water jet cutter 4, a plasma torch, or a puncher 4'.

With reference to FIGS. 3B, 3C, 4B and 5B, said cutting head 3 comprises a puncher 4'. The cutting head 3 moves by means of said moving means also vertically along the vertical axis Z for realizing said punching of the strip 2. In particular, the puncher 4' comprises a plurality of punches 4" having different geometries each other. Said punches 4" are operatively connected and are slidable with respect to the head 3 along axes P that are parallel to the punching direction Z, for operating the selection of the punch 4" required to the perforation of the strip 2. Preferably, said punches 4" are initially retracted in the cutting head 3. When a determined punch 4" is selected, it is advanced and surfaced from the head 3 until an operative position is reached. The head 3 internally comprises means for actuating, advancing and blocking the punches 4".

The punches 4" have punching ends having specific shapes which generates holes on the strip 2 having said shapes, when the punches 4" are engraved on the strip 2 through pressure or percussion along the vertical axis Z. The geometrical shapes of the punches 4" of the head 3 are all different to each other both for dimension and/or shape. For example, in a particular embodiment, all the punches 4" have circular shapes but with different diameters. In a further embodiment, certain punches 4"' have different shapes, for example squares, stars, triangles or circles, etc. Once a determined punch 4", having a determined punching shape, is selected, the head 3 moves toward the strip 2 along a vertical direction Z and makes the punching of the strip 2 with said punching shape. This movement along the vertical direction Z is permitted by the moving means which, when the head 3 comprises a puncher 4', can be also configured to move the head 3 of the cutting device 1 along a vertical direction Z, thus along an axis normal to the levelling plane 5 of the cutting device 1. The impulse to move the cutting head 3 according to the vertical axis Z is provided by the control unit 18 which generates an actuation signal. This action can be operated in a single specific point of the strip surface or repeated in more points, moving the cutting head 3 along the horizontal axes X,Y by means of said moving means commanded by the control unit 18. The control unit 18 also generates a control signal configured to control the movement of said moving means, thus the positioning of the cutting head 3 along X and Y. The control signal is a function of the diameter D of the conduit 14 to be realized and of the width B of the strip 2, while the actuation signal of the cutting head 3 operates the punching of said holes 13 of the arrays 12. Said control and actuation signals are coordinated each other.

The control unit 18 is also configured to select the right punch for performing a specific type of hole 13, for example once a first punch is used, it is retracted and a second punch is selected in the same way. The second punch operates a punching of the strip 2 in different points with respect to the first punch. Further punches with other punching shapes can be used to realize further holes in different point of the strip 2 surface.

The puncher 1 can comprise a plurality of heads having punches 4" different to each other for increasing the number of tools available, or having the same types of punches 4" for operating the holes faster.

Alternatively, as shown in FIGS. 3A, 4A and 5A, when said cutting head 3 comprises a laser cutter (identified with the same reference number 4), the laser beam is directed toward the levelling plane 5 in a vertical direction Z. Moving the cutting head 3 along the axis X, or along the axes X and Y through said moving means, also the laser cutter 4 is moved consequently. The control unit 18 is configured to control the movements of the cutting head 3 according to horizontal axes X,Y. A control signal generates by the control unit 18 commands the execution of the moving means of the cutting head 3. An actuation signal is generated by the control unit 18 for operating the laser beam and consequently the cut of strip 2. In this way, the laser beam of the laser cutter 4 can create holes 13 having any shape both in term of dimension and shape. The laser burns the strip material 2 realizing said holes 13. Said cutting head 3 can comprise also more than one laser cutters 4. Said laser cutter head, thus said head 3 equipped with a laser cutter, is realized according to a known means.

Optionally, the moving means controlled by the control unit 18 allow also to move the cutting head 3 according to a vertical axis Z for approaching or turning away the laser cutter 4 to/from the strip 2. In this way is possible to modify the depth of laser field and consequently the power density of the laser itself.

In a further embodiment, as shown in FIGS. 3A, 4A and 5A, when said cutting head 3 comprises a water jet cutter (identified again with the reference number 4), the water jet under pressure, with or without the addiction of abrasive material, cuts the material of the strip according to a direction Z normal to levelling plane 5. As in the case of laser cutter, moving the cutting head 3 along the axis X or the axes X and Y through said moving means controlled by the control unit 18, is possible to obtain any shape of the hole 13. The head 3 with the water jet cutter 4 is realized according to known means. Optionally, the moving means controlled by the control unit 18 are configured to move the cutting head 3 along the vertical axis Z for approaching or turning away the water jet cutter 4 with respect to the strip 2. In this way is possible to modify the cutting intensity of the water jet for strips 2 having larger thicknesses. The control unit 18 is also configured to operate the water jet cutter for performing the cutting of the strip 2.

Finally, as shown in FIGS. 3A, 4A and 5A, when said cutting head 3 comprises a plasma torch (identified again with the reference number 4), the plasma cuts the material of the strip 2 according to a direction Z normal to the levelling plane 5. As for the previous two cases, moving the cutting head 3 through said moving means controlled by the control unit 18 along X,Y is possible to realize holes 13 having any shape and dimension. The cutting head 3 with plasma torque is realized according to known means. Optionally, the moving means controlled by the control unit 18 are configured to move the cutting head along the vertical axis Z for approaching or turning away the plasma torch 4 to/from to the strip 2 for changing the cutting intensity. The control unit 18 is also configured to operate the plasma torch for performing the cutting of the strip 2.

In the four embodiments of the cutting head 3 described above, the strip 2 can move back and forth with respect to the cutting head 3 which moves only along the axis X through the moving means, while the strip 2 moves by means of the feeding device 11. Alternatively, the strip 2 remains still during the cutting and the cutting head 3 moves along its axes X and Y by means of the moving means. In any case, said moving means are controlled by the control unit which generates a control signal for determining instant by instant the positioning along the axes X, Y and Z of the cutting head and an actuation signal of the cutting head 3 to operate the cutting of said holes 13 of said arrays 12 on the strip 2. Said control and actuation signals are coordinated each other. Said control unit commands the moving means as a function of the diameter D of the conduit 14 to be realized and of the strip width, so that the cutting head 3 generates on the strip 2 a plurality of arrays 12 of holes 13, each one tilted with respect to one of the longitudinal edges 9 of the strip 2 by an angle α that is function of the width B of the strip 2 and of the diameter D of the spiral conduit 14 to be realized. In this way the arrays 12 of holes 13 are aligned and ordinated on the conduit 14.

The group of holes 13 constitutes the array of holes 12. Said array 12 can have from 1 to n columns and from 1 to m rows of holes. For example, the array 12 represented in FIG. 1 comprises three columns and three rows and globally nine holes. The holes constituting the array 12 can have different shapes and dimensions. Each hole has specific matrix coordinates, with respect to a relative reference system 25 having abscissa inclined of an angle α with respect to the edges of the strip 2 and origin (coordinates 0,0) positioned along the median axis M of the strip 2. Alternatively, the origin of the arrays 12 lies on an axis parallel to the median axis M of the strip 2. Each array 12 has its relative reference system 2. Consecutives arrays 12 are at a predetermined distance L each other. The apparatus 10 can comprise a measuring instrument adapted to measure the distance covered by the strip 2, for example from its initial end with respect to a fix element of the apparatus 10, for example the cutting device 1. The geometrical parameters of the array 12 can be selected by the user through a human-machine interface operatively connected to the control unit 18 as described in the details the following. The arrays 12 can be all equal, all different or in part equal and in part different.

As already outlined, the positioning of the cutting head 3 with respect to the strip 2 in a specific point of its surface can be performed by moving the strip 2 along the feeding direction F and moving the cutting head 3 along the direction X, or moving the head 3 along the directions X and Y and maintaining the strip 2 still on the levelling plane 5. In a alternative embodiment shown in FIGS. 5A and 5B, the head 3 is also configured to rotate about the vertical axis Z in a direction R.

As already mentioned, the cutting device 1 comprises moving means (not shown) configured to move the head 3 according to one or more operative directions X, Y, Z and R, and controlled by the control unit 18. Said moving means are of known type, for example electromechanical or electro-pneumatic.

As already mentioned, the cutting device 1 also comprises a control unit 18 configured to command the movements of the cutting head 3. Said control unit 18 is configured to control the movements of the head 3 as a function of the width B of the strip 2 and of the diameter D of the conduit 14 to be realized. In particular, the array 12 and its relative reference systems 25 are tilted by an angle α which is function of the width B of the strip 2 and of the diameter D of the spiral conduit 14. These parameters are a first level of control of the head 3 through the control unit 18.

Said control unit 18 can be also configured to command the feeding device 11 of the strip 2 so to coordinate its movements with that of the cutting head 3 and/or that of forming device 6, so that said sections of the apparatus 10 work in an operatively connected manner for realizing arrays 12 of holes 13 without imperfections and aligned.

To make all the holes 13 of the arrays 12 parallel to the spiral conduit 14, in particular to its symmetry axis, the selection of the right titling angle α of the array is very important. For example, if a squared hole is cut with sides parallel to the edges 9 of the strip 2, the square will be crooked on the spiral conduit 14. To avoid this inconvenient, the tilting angle α of the array 12, and consequently the tilting angle of each hole 13, is substantially equal to the inverse function of the cosine of an angle equal to $B/\pi D$, thus $\alpha = \arccos(B/\pi D)$. If the same squared hole is inclined by an angle α equal to $\arccos(B/\pi D)$ with respect to the longitudinal edges 9 of the strip 2, the square will be straight on the spiral conduit 14, thus with its sides parallel to the conduit axis 14. This applies in particular when the strip 2 is spirally wounded and welded and consequently an overlapping of opposite longitudinal sides 2A,2B of the strip 2 is absent.

If the strip 2 is seamed, depending on the width of the strip 2 portion involved in the seaming, said function is adjusted.

Specifically, with reference to FIGS. 8 and 10, a portion 2A, 2B of the strip 2 is bended and seamed by the forming device 6 for realizing the seaming shown in FIG. 8. The portions 2A,2B have substantially the same width because the seaming is symmetric; it would be different in case of asymmetric seaming. Depending on the forming device 6 used, the width of the portions 2A, 2B used for the seaming can change. In general, the width B' of the seaming of the portions 2A,2B is substantially half of the width B" of the portions 2A, 2B because these are bent on themselves. Since only half of portions 2A, 2B of the strip 2 contributes to the length of the conduit 14, the useful width employed in the calculation of said formula is not the width B of the strip 2, but the width of the strip B reduced by the width required to perform the seaming. Since the width of the seaming B' is smaller than the width of the strip 2, the portion of strip 2 contributing to the overall length of the conduit 14 is substantially similar to the width of the strip 2. In any case, the correct formula for calculating said titling angle $\alpha$ is the following $\alpha$=arccos $[(B-3B')/\pi D]$, where 3B' is the width of the strip used for performing the seaming, that is equal to three times the width of the seaming itself.

For example the strip 2 can be wide 137 mm, the seaming 7 mm and the longitudinal sides used for the seaming 14 mm.

To make the holes 13 of the arrays 12 aligned each other along the spiral conduit 14, the distance between arrays 12 is very important. For example, if some circles are cut on the strip 2 along a direction F and at a random distance each other, said circles will be misaligned on the spiral conduit 14. To avoid this inconvenient, the distance L between next holes, thus holes having same matrix coordinates but belonging to subsequent arrays, is substantially equal to $(\pi D)^2/[(\pi D)^2-B^2]^{(1/2)}$. According to the above description, when the strip 2 is seamed, the width of the strip 2 which contributes to the effective extent of the conduit 14 is reduced (highlighted in gray in FIG. 10), and the formula for calculating the distance L becomes: $(\pi D)^2/[(\pi D)^2-(B-3B')^2]^{(1/2)}$. In this way, the holes are aligned each other according to a direction parallel to the symmetry axis of the spiral conduit 14.

In the FIG. 10 is shown the strip 2 having a width B and holed by the cutting device 1 before being spirally wounded and joined to form the conduit 14. Some relative reference systems 25 are shown, each one with an origin (coordinates 0,0) on the median axis of the strip 2 and y-axis tilted of an angle $\alpha$ equal to arccos $[(B-3B')/\pi D]$. The origins of subsequent relative reference Cartesian systems 25 are spaced out of a distance L that is equal to $(\pi D)^2/[(\pi D)^2-(B-3B')^2]^{(1/2)}$. This distance is measured along the feeding direction F. All relative reference systems 25 are also tilted by an angle $\alpha$ equal to arccos $[(B-3B')/\pi D]$. In this respect the term array 12 and reference system are can be used as synonym. In FIG. 10, like in FIGS. 1 and 7, the pitch H of the spiral of the conduit 14 is shown.

As previously said, the control unit 18 is configured to coordinate the cutting device 1, in particular the movements of the head 3, with the movements of feeding device 11 and/or forming rollers 8.

In addition, the control unit 18 can comprise a second level of control of the cutting head 3 according to operational factors of conduit 14. A conduit 14, before being positioned in an environment, it requires a feasibility study and an installation project which needs to compliant with aesthetic and functional criteria. For example an environment is considered comfortable when the air conduit outflows an airflow through the holes that is at a speed of about 0.2 m/s at 2 meters from the ground. In function of the temperature of the environment, the shape of the environment (volume, dimension, windows, etc.) and of the positioning of the conduit in the room, it's possible to determine the optimal distribution of holes on the conduit to reach the best achievable comfort.

The control unit 18 can comprise a human-machine interface 22 adapted to permit the graphical simulation of the environment wherein the conduit is installed and/or the insertion of some operative parameters, like:
  dimensional parameters of said environment, like volume, length, height and width;
  construction parameters of the conduit, like its positioning in the environment and the selected diameter;
  suitable environment parameters, like the cooling and/or heating temperature.

Said human-machine interface 22 comprises a processing unit configured to simulate said inlet parameters and to generate an optimal arrangement and dimensioning of the holes 13 and of the relative arrays 12 on the conduit 14. Based on said optimal arrangement and dimensioning, the control unit 18 controls the movements of the cutting head 3 by means of said moving means and feeding device 11 of the strip 2.

In a particular embodiment of the present apparatus, the cutting device 1 is configured to cut the strip 2 upward, so that eventual scraps of the metal strip remain on the inner side of the conduit 14, once the strip 2 is spirally wounded and joined along opposite longitudinal sides 2A, 2B. In this way the risk of injuries during the handling of the conduit is reduced. This aspect is more evident when the cuts are performed by a punching 4'.

In an alternative version of the apparatus 10 shown in FIG. 6, to obtain the same effect, thus to arrange eventual scraps deriving by the cutting in the inner side of conduit 14 and not on the external side, the apparatus 10' comprises a winder 26 adapted to rotate on itself the strip 2 of 180° about its own median axis M. Said winder 26 is configured as a spiral longitudinally wounded and comprising side rails, adapted to overturn the strip 2 without deforming or damaging it.

In a further embodiment represented in FIG. 7, the strip 2 is wounded in an inverted sense with respect to the solution of FIG. 1, thus according to an opposite winding sense. Observing the conduit 14 from its end 14', the strip 2 is counterclockwise wrapped and not clockwise as it occurs in the solution of FIG. 1. To do it, the apparatus 10" comprises a forming device 6 wherein the strip 2 enters from the top and exits from the top, contrary to what occurs in the solution of FIG. 1 wherein the strip enters from below and exits from the below part of the spiral.

The apparatus 10 so conceived is extremely compact and can be installed on a platform 23, so to be transported by means of a truck in any place. In this way, the manufacturing of the conduits can be realized directly on the spot with considerable savings on the logistic cost, because the conduits 14 are voluminous and consequently difficultly transportable.

In a particular embodiment shown in FIG. 12, the arrays 12 are different each other and in particular they represent alphabetic letters or in alternative numbers or symbols. The arrangement of holes 13 of the arrays 12 can be so to reproduce letters or numbers, and the alignment of more arrays 12 on the conduit 14 permits to reproduce words or acronyms, for example trademarks. In a particular embodiment of the human-machine interface 22, inserting a word or acronym as input to said interface 22, the control unit 18 commands the cutting head 3, and its moving means and/or the feeding device, so to reproduce through the holes 13 of the arrays 12 said word or acronym on the strip 2, before it is wounded and seamed to form the conduit 14. The conduit 14 so generated has a word or an acronym tadily reproduced on its side, so that the user can perceive and read it on the conduit 14, as shown in FIG. 12.

In this particular embodiment, both the conduit 14 and the strip 2 comprise holes 13 having different geometries. Even the arrays 12 of holes 13 are different each other or in any case the arrays 12 are different each other, for example an array reproduces the letter "A" while the neighbour array reproduces the letter "D". The arrays 12 can have different holes even for differentiating the airflow from array to array. In particular, the more downstream arrays 12 in a conduit 14 require bigger holes because the loss of flow and pressure along the conduit 14. Consequently, the holes 13 of the arrays 12 can change in dimension and number proceeding according to the flows direction in the conduit.

The apparatus so conceived is also usable with painted strips, in particular strips painted with epoxy paint. In particular, in the case of punching, the painting is not affected by the working.

Said apparatus is also suitable for being used with strips having width comprised between 70 and 200 mm, preferably 137 mm, with a thickness comprised between 0.05 and 0.15 mm, and also for manufacturing conduits having a diameter between 80 and 2.000 mm.

It's a further scope of the present invention an air conduit 14 of the type obtained from a strip 2 spirally bends and lock seamed, as shown in FIG. 9. Said conduit 14 comprises a plurality of arrays 12 of holes 13. Said arrays 12 are aligned along the conduit 14, in particular along a direction that is parallel to the symmetry axis of the conduit 14. Each array 12 is tilted with respect to one of the longitudinal edges 9 of the strip 2 by an angle α which is function of the width B of the strip 2 and of the diameter D of the spiral conduit 14, said angle α is calculated as described above. In particular, each of said arrays 12 comprises at least two different shapes of holes 13 that are different each other, as shown in FIG. 9.

In a particular embodiment (not shown) of the apparatus 10, it does not comprise the forming device 6 and the strip is only moved by the feeding device 11 and cut by the cutting device 1. In this case, the output of the apparatus 10 is a perforated strip 2' which can be optionally wounded in a coil 19 of perforated strip 2'. The perforated strip 2' is realized accordingly the above description and can be used in a second time on a traditional machine for realizing spirally wounded and seamed conduits, so to realize a conduit 14 according to the present invention.

It's so a further scope of the present invention a perforated strip 2' for realizing air conduits 14 of the type spirally seamed and comprising a plurality of arrays 12 of holes 13, as shown in FIG. 10. Said arrays 12 are aligned along the strip 2, in particular they are aligned along the median axis M of the conduit 14. Said arrays 12 of holes are tilted with respect to one of the longitudinal edges 9 of the perforated strip 2' by an angle α which is function of the width B of the strip 2 and of the diameter D of the spiral conduit 14 to be realized. Said angle α is calculated as described above. In particular, each of said arrays 12 comprises at least two different shapes of holes 13 that are different each other, as shown in FIG. 10.

It's also a further scope of the present invention a coil 19 of a perforated strip 2' as described above (shown in FIG. 11). A coil 19 so conceived can be delivered more easily with respect to a formed conduit, so to realizing on the spot the conduit, thus close to the place wherein it will be installed.

A final scope of the present invention is a manufacturing method of an air spirally wound conduit 14 obtained from a strip 2 and having a plurality of arrays 12 aligned with each other along the conduit 14. The manufacturing method comprises two main phases, which can occur in sequence or distanced-over-time.

The first phase provides to perforate the strip 2 with a plurality of arrays 12 of holes 13 tilted with respect to one of the longitudinal edges 9 of the strip 2 by an angle α which is function of the width B of the strip 2 and of the diameter D of the conduit 14 to be realized.

In particular, the holes 13 of said arrays 12 comprise at least two different shapes of holes 13 which allow to differentiate the airflow ouflowing the conduit 14.

Said arrays are preferably tilted by an angle α which is equal to arccos $[(B-3B')/\pi D]$, wherein B' is the width of the seaming of the longitudinal sides 2A,2B of the strip 2. Furthermore, subsequent arrays 12 have a distance between corresponding holes that is substantially equal to $(\pi D)^2/[(\pi D)^2-(B-3B')^2]^{1/2}$.

The second phase of the method provides to spirally bend and seam said strip 2 so that said conduit 14 has a predefined diameter D.

The method so conceived permits to obtain a spiral conduit 14 having holes aligned and improved performances in term of air diffusion.

Finally, the apparatus 10 for forming a spiral wound conduit 14 from a flat strip 2 can comprise: a forming device 6 comprising a bending section 7 configured to spirally bend the strip 2 and a joining section 8 configured to join opposite longitudinal edges 9 of the strip 2 each other; a feeding device 11 of the strip 2 along a feeding direction F parallel to the longitudinal edges 9 of the strip 2; a punching machine 1 arranged upstream the forming device 6 comprising a punching head 3 moveable along an axis X orthogonal to the feeding direction F of the strip 2 and parallel to a levelling plane 5 on which the strip 2 lies, said head 3 comprising a plurality of punches 4 alternatively selectable, said punches 4 having different shapes from one another, so to realize on the strip 2 a plurality of arrays 12 of holes 13 each one tilted with respect to one of the longitudinal edges 9 of the strip 2 by an angle α function of the width B of the strip 2 and of the diameter D of the spiral conduit 14 to be realized.

Concluding, the invention so conceived is susceptible to many modifications and variations all of which fall within the scope of the inventive concept, furthermore all features can be substituted to technically equivalent alternatives. Practically, the quantities can be varied depending on the specific technical exigencies.

I claim:

1. An Apparatus for forming a spirally wound conduit from a flat strip comprising:
   a forming device comprising a bending section configured to spiralling bend the strip and a joining section configured to join opposite longitudinal sides of the strip each other;
   a feeding device of the strip along a feeding direction (F) parallel to the longitudinal edges of the strip;
   a cutting device arranged upstream the forming device comprising a cutting head for cutting the strip and moving means configured to move said cutting head along a plurality of moving axes orthogonal to each other;
   a control unit configured to command said moving means according to a diameter of the conduit to be realized and to a width of the strip so that said cutting head realizes on the strip a plurality of arrays of holes each one tilted with respect to one of the longitudinal edges of the strip by an angle that is function of the width of the strip and of the diameter of the spiral conduit to be realized.

2. The apparatus according to claim 1, wherein said cutting head comprises one among: a laser cutter, a water jet cutter, a plasma torch, or a puncher.

3. The apparatus according to claim 2, wherein, when said cutting head comprises the puncher, the latter comprises a plurality of punches preferably said punches being slidable with respect to the head along a direction parallel to vertical moving axis for realizing said punch selection.

4. The apparatus according to claim 1, wherein said moving means are configured to move said cutting head along an axis orthogonal to the feeding direction of the strip and parallel to a levelling plane on which the strip lies and along a longitudinal axis parallel to the feeding direction and/or along a vertical axis to said levelling plane.

5. The apparatus according to claim 1, wherein said control unit is configured to generate a control signal for the moving means which is function of the diameter of the conduit to be realized and of the width of the strip, and an actuation signal of the cutting head to operate the cutting of said arrays of holes on the strip, said control and actuation signals being coordinated with each other.

6. The apparatus according to claim 1, wherein said control unit is also configured to command the feeding device of the strip in a coordinated manner with the cutting head and/or the forming device.

7. The apparatus according to claim 6, wherein the control unit is operatively connected to a human-machine interface provided with a processing unit adapted to simulate an optimal arrangement and a sizing of said holes of said arrays as a function of input parameters associated to conditions of use of the conduit, preferably to dimensional parameters of a room of installation of the conduit, to geometric parameters of the conduit and to environmental parameters associated to said installation room.

8. The apparatus according to claim 1, wherein said tilting angle of the array is substantially:

$$\alpha = \cos^{-1}\frac{B}{\pi D}$$

wherein B is the width of the strip and D is the diameter of the conduit;

preferably said tilting angle is $\alpha=\arccos\,[(B-3B')/\pi D]$, wherein B is the width of seaming of opposite longitudinal sides of the strip.

9. The apparatus according claim 8, wherein consecutive arrays have a distance between corresponding holes, or between origins of the arrays, substantially equal to $(\pi D)^2/[(\pi D)^2-B^2]^{(1/2)}$; preferably said distance between corresponding holes is equal to $(\pi D)^2/[(\pi D)^2-(B-3B')^2]^{(1/2)}$.

10. The apparatus according to claim 1, comprising a bending device configured to bend opposite longitudinal sides of the strip so that they are at least in part complementary each other, and wherein said joining section comprises a lock seamer machine configured to lock said opposite longitudinal sides of the strip.

11. The apparatus according to claim 1, wherein said holes of said arrays comprise at least two different shapes.

12. The apparatus according to claim 1, wherein said array of holes represents a number, a letter or a symbol.

13. The apparatus according to claim 1, wherein said plurality of arrays of holes comprise at least two types of arrays of holes different one from the other.

14. An air conduit of the type obtained from a strip spirally bent and lock seamed, and comprising a plurality of arrays of holes, said arrays being aligned on the conduit, each array being tilted with respect to one of the longitudinal edges of the strip by an angle that is a function of the width of the strip and of the diameter of the spiral conduit, wherein said holes of said arrays comprise at least two different shapes of holes:

wherein a tilting angle of the each array is substantially equal to $$\alpha = \cos^{-1}\left(\frac{B-3\cdot B'}{\pi\cdot D}\right)$$

wherein B is the width of the strip, D is the diameter of the conduit, and B' is the width of seaming of opposite longitudinal sides of the strip.

\* \* \* \* \*